(12) United States Patent
Hull

(10) Patent No.: US 7,083,103 B2
(45) Date of Patent: Aug. 1, 2006

(54) DATA COLLECTION DEVICE AND METHOD

(76) Inventor: Mark D. Hull, 25597 Camino Vista, Hayward, CA (US) 94541

( * ) Notice: Subject to any disclaimer, the term of this patent is extended or adjusted under 35 U.S.C. 154(b) by 22 days.

(21) Appl. No.: 10/802,270

(22) Filed: Mar. 17, 2004

(65) Prior Publication Data

US 2004/0222303 A1    Nov. 11, 2004

Related U.S. Application Data

(60) Provisional application No. 60/455,465, filed on Mar. 18, 2003.

(51) Int. Cl.
*G06K 19/00* (2006.01)

(52) U.S. Cl. .................. 235/487; 235/385; 235/435; 206/459.5; 229/400; 220/254.3

(58) Field of Classification Search ............. 220/254.3
See application file for complete search history.

(56) References Cited

U.S. PATENT DOCUMENTS

| | | | |
|---|---|---|---|
| 2,563,352 A | 8/1951 | Morse | |
| 2,685,860 A | 8/1954 | Plakas | |
| 2,723,643 A | 11/1955 | Weiss | |
| 3,392,468 A | 7/1968 | Wolf | |
| 3,974,916 A | 8/1976 | Bartolucci | |
| 4,207,982 A | 6/1980 | Maxwell et al. | |
| 4,287,824 A | 9/1981 | Boyle | |
| 4,345,315 A | 8/1982 | Cadotte et al. | |
| 4,378,391 A | 3/1983 | Allen | |
| 4,506,913 A | 3/1985 | Kim | |
| 4,518,639 A | 5/1985 | Phillips | |
| 4,752,087 A | 6/1988 | Weisbach | |
| 4,780,599 A | 10/1988 | Baus | |
| 4,805,775 A | 2/1989 | Fear | |
| 4,857,715 A | 8/1989 | Koch et al. | |
| 5,038,367 A | 8/1991 | Casey et al. | |
| 5,041,972 A | 8/1991 | Frost | |
| 5,102,036 A | 4/1992 | Orr et al. | |
| 5,163,608 A * | 11/1992 | Block | 229/92.8 |
| 5,197,624 A | 3/1993 | Dodaro | |
| 5,198,642 A | 3/1993 | Deniger | |
| 5,237,157 A | 8/1993 | Kaplan | |
| 5,421,286 A | 6/1995 | McLean | |
| D371,049 S | 6/1996 | Cuthbertson et al. | |
| 5,533,782 A | 7/1996 | Goldman | |
| 5,535,118 A | 7/1996 | Chumbley | |
| 5,667,134 A * | 9/1997 | Olson et al. | 229/92.8 |
| 5,667,135 A | 9/1997 | Schaefer | |
| 5,669,553 A | 9/1997 | Smith | |
| 5,716,688 A | 2/1998 | Burke et al. | |
| 5,822,744 A | 10/1998 | Kesel | |
| 5,890,594 A | 4/1999 | Hansen et al. | |
| 6,070,755 A | 6/2000 | Evans et al. | |

(Continued)

FOREIGN PATENT DOCUMENTS

GB      2194767 A      3/1988

*Primary Examiner*—Seung H Lee
(74) *Attorney, Agent, or Firm*—Seyfarth Shaw LLP

(57) ABSTRACT

A device and method for collecting data from a beverage container. The device is comprised of a drink sleeve or beverage container with at least one question and answer cell, the question and answer cell having a question and response portion. When a user is given the device, he or she responds to at least one question presented and returns the device for data analysis.

22 Claims, 8 Drawing Sheets

U.S. PATENT DOCUMENTS

| | | |
|---|---|---|
| 6,092,775 A | 7/2000 | Gallant |
| 6,095,033 A | 8/2000 | Melton |
| 6,158,155 A | 12/2000 | Boney |
| 6,206,229 B1 | 3/2001 | Harjes |
| D440,825 S | 4/2001 | Carter et al. |
| 6,209,780 B1 | 4/2001 | Jensen |
| 6,276,551 B1 | 8/2001 | Miller |
| 6,299,014 B1 | 10/2001 | Nava et al. |
| 6,302,288 B1 | 10/2001 | Nava et al. |
| 6,311,840 B1 | 11/2001 | Shrader |
| 6,325,421 B1 | 12/2001 | Huebner |
| 6,354,458 B1 | 3/2002 | Policappelli |
| 6,508,361 B1 | 1/2003 | Shrader |
| 2001/0037206 A1 | 11/2001 | Falk et al. |

* cited by examiner

DATA COLLECTION DEVICE AND METHOD

CROSS REFERENCE TO RELATED APPLICATION

This application claims priority from U.S. provisional application No. 60/455,465 filed on Mar. 18, 2003.

FIELD OF THE INVENTION

This invention relates generally to data collection devices used in connection with beverage containers.

BACKGROUND OF THE INVENTION

Advertisers often use disposable packages, containers, and drink sleeves to market products and/or services. For example, fast food containers, such as beverage cups and French fry holders, often display advertising slogans. Disposable drink sleeves, which are commonly used to protect consumers' hands from the heat of coffee, often contain similar messages. After the product is consumed, however, the container or drink sleeve is simply thrown away, and the advertiser remains in the dark regarding who read the particular advertisement and what response the advertisement provoked.

DETAILED DESCRIPTION

Figure 1:
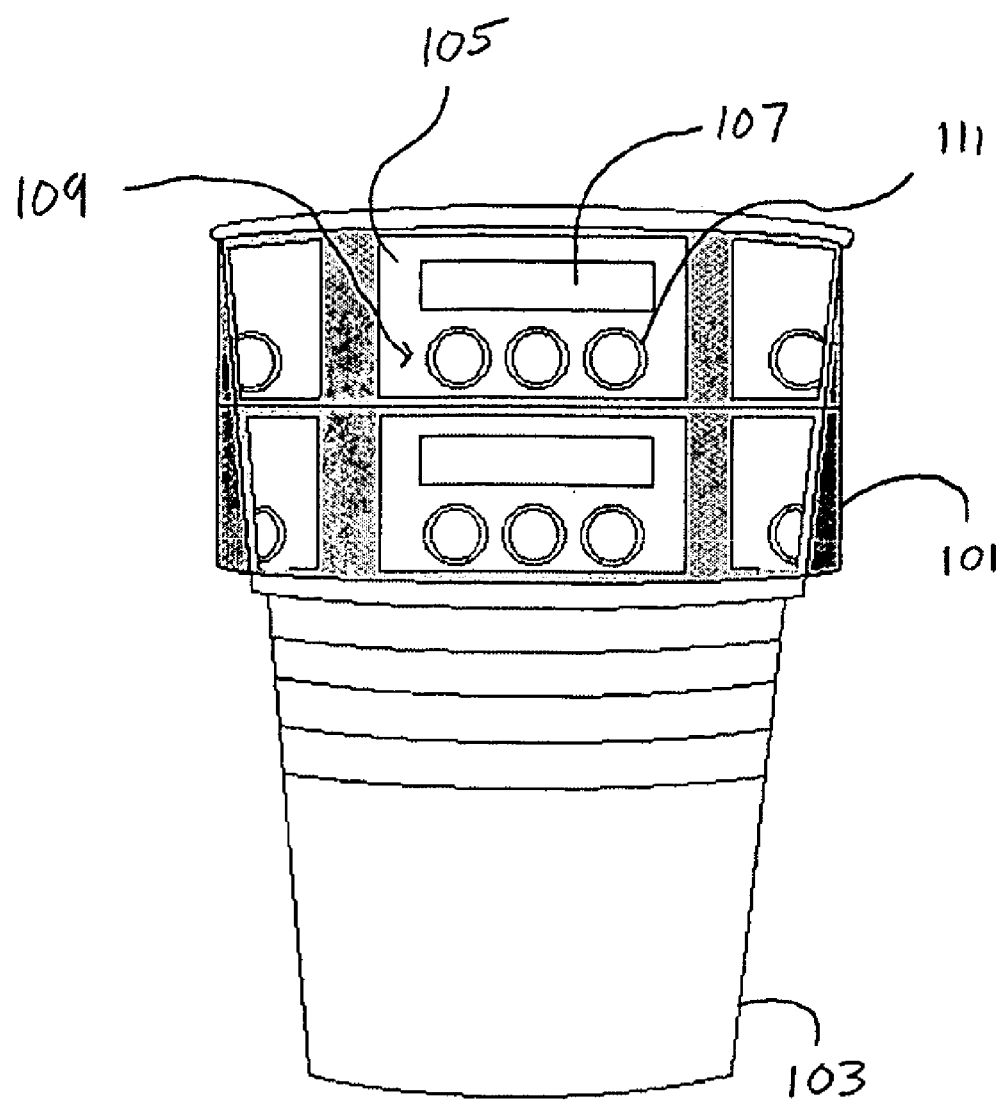
FIG. 1 is a side view of one example of a Data Collection Device (DCD) implemented as a drink sleeve that is wrapped around a beverage container.
Figure 2:
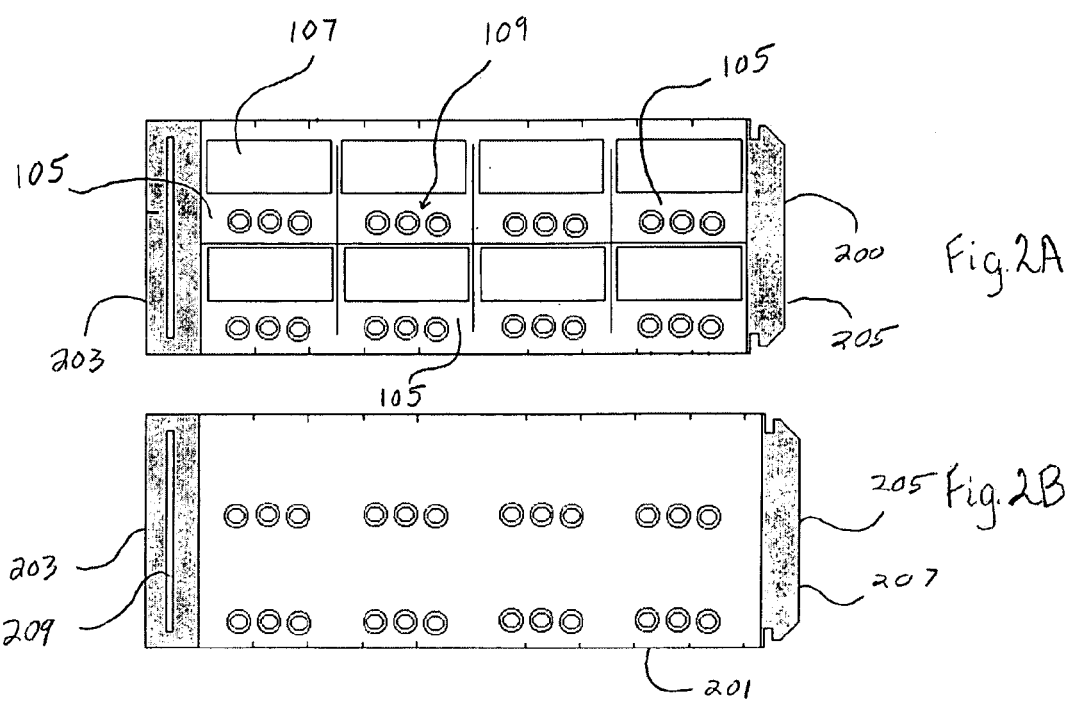
FIG. 2A is a plan view of a front side of the DCD of FIG. 1.
FIG. 2B is a plan view of a back side of the DCD of FIG. 1.

FIG. 1 illustrates one example of a Data Collection Device (DCD) 101 and beverage container 103. In the example of FIG. 1, DCD 101 is shown implemented as a drink sleeve 104 wrapped around beverage container 103. DCD 101 in one example is constructed of thin polymer plastic, although this disclosure envisions that additional materials (e.g., paper, cardboard, etc.) could be used to construct DCD 101. DCD 101 includes one or more instances of question and answer cell 105. Question and answer cell 105 in one example comprises a question portion 107 and a response portion 109. Response portion 109 in one example includes one more instances of depressible button 111. Depressible button 111 in one example is constructed of plastic and is bonded to DCD 101 through use of an adhesive. In another example, depressible button 111 is formed integrally with DCD 101 through stamping or molding. Depressible button 111, as will be discussed with respect to FIG. 2, is utilized to indicate a response from a user. Accordingly, depressible button 111 in one example is constructed to remain in a depressed state when pushed down. It should be noted the depressible button 111 is shown for exemplary purposes only. It is envisioned that other information conveying devices could be used in place of depressible button 111. For example, DCD 101 could have a response portion with an open space for the user to indicate a response, could operate on punch card principles, or could have check boxes for pencil marking. The particular information conveying device chosen will depend on the goals and objectives of the manufacturer, designer, vendors and end users of DCD 101. The DCD 101 could be used for a variety of purposes, including but not limited to, collecting demographic information, conducting polls, receiving customer feedback, and conducting sweepstakes.

In a further example, beverage container 103 could hold other products used by the target consumer. Whatever the product, DCD would simply have to be shaped such that it could fit on or around beverage container 103. Beverage container can be made of paper, glass, plastic, masonry or any other materials deemed suitable to hold these products.

Referring to FIGS. 2A and 2B, DCD 101 in one example comprises a front 200 and back 201. Front portion 200 depicts the one or more question and answer cells 105, which include question portion 107 and response portion 109. Question portion 107 is utilized to ask a user for information (e.g., demographic, opinion, trivia, etc.). The particular questions asked in question portion 107 can be appended to question by any known means, such as labels, ink, paint, etc. The particular question could be framed in multiple choice, checkbox, or write in format. Response portion 109 provides the particular information conveying device, such as depressible button 111 for the user to indicate a response to question portion 107.

Referring now to FIGS. 1, 2A and 2B, the exemplary DCD 101 shown in FIG. 1 wraps around beverage container 103 by bending and joining end 203 to end 205. As shown in FIG. 2, end 203 is connected to end 205 by inserting tapered portion 207 of end 205 into slot portion 209 of end 203. The present disclosure envisions, however, that ends 203 and 205 could be connected through other fastening means, such as glue, or hook-and-loop fasteners. In addition DCD 101 could be constructed such that ends 203 and 205 are connected integrally.

DCD 101 is operated by a user reading a survey question located in question portion 107 and choosing a response, identifying the user's feelings and beliefs related to the question, located in response portion 109. In other words, question portion 107 could be presented in a multiple choice format, and each depressible button 111 in response portion 109 could correspond to a response presented in question portion 107. In another example, possible answers to the question(s) in question portion 107 could be presented in response portion 109 as corresponding to each depressible button 111. As another alternative, response portion 109 could contain check boxes or write-in boxes for a user to manually check or write-in a response to the questions presented in question portion 107. The particular layout of question portion 107 and response portion will depend on the information conveying device employed in DCD 101. In the DCD shown in FIGS. 1 and 2, the user makes a choice by depressing the depressible button 111 located on the DCD 101 that corresponds to their response. The user then moves onto the next question(s), if applicable, until some or all have been completed. When the survey is completed, the user will turn in the DCD 101 to a collection point, such as a drop box, food counter, etc. As a reward and incentive for completing DCD 101, the user could receive a reward, such as a gift, coupons, money, etc. Completed DCDs 101 are then sent to one or more central processing centers for data analysis.

The method of using DCD 101 as a system for surveying and collecting consumer data has a variety of concept line extensions and variations. The following are descriptions of line extensions and variations of DCD 101.

Figure 3:
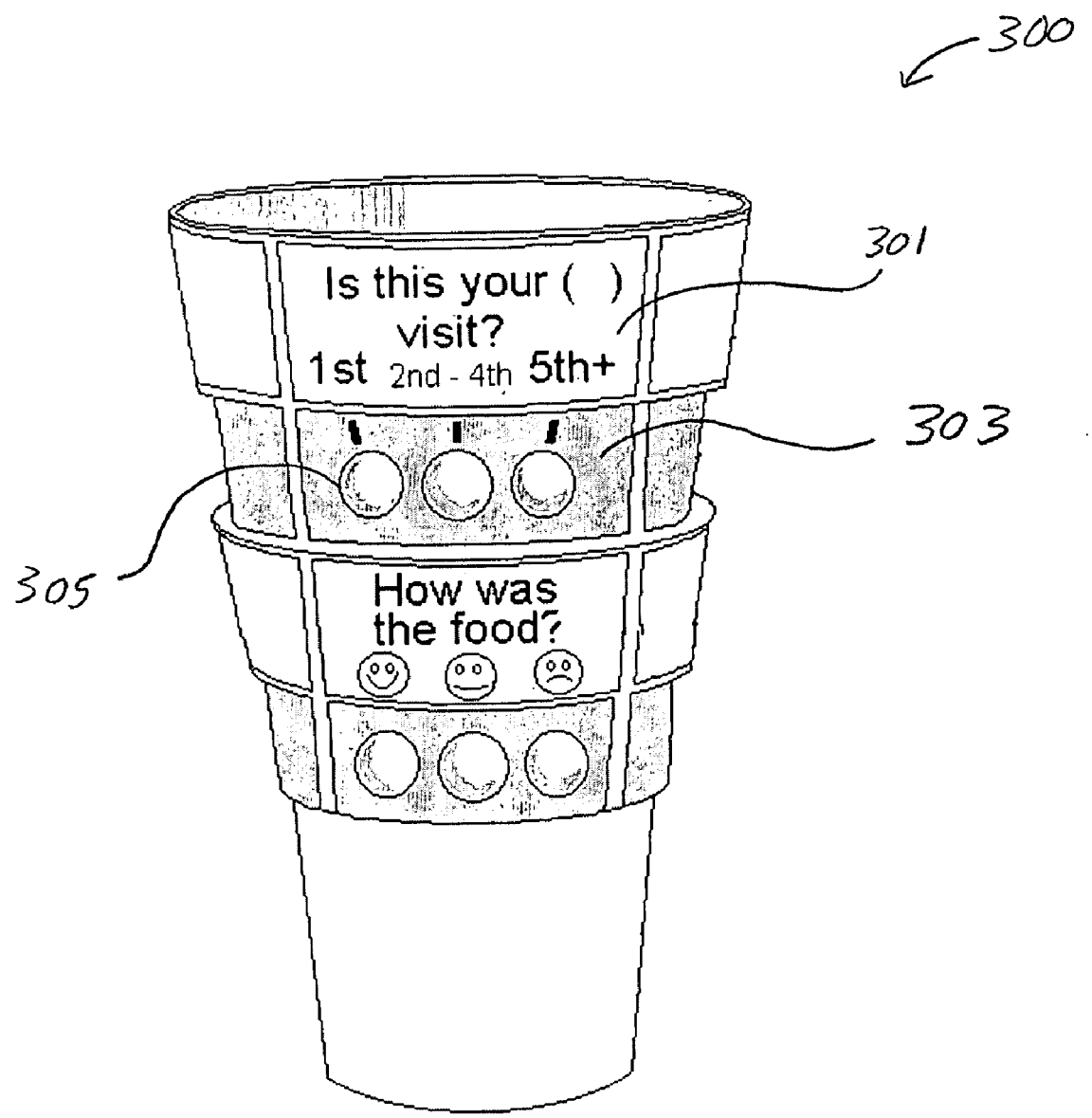
FIG. 3 is a side perspective view of a DCD attached directly to a beverage container.

In FIG. 3, a beverage container 300 has one or more question portions 301 and one or more response portions 303 attached. Question portions 301 and response portions 303 in one example are attached to beverage container 300 through an intermediate means, such as a label. In another example, question portions 301 and response portions 303 are written or painted on beverage container 300. In another example, response portions 303 each contain one or more depressible buttons 305, or other information gathering device, for a user to indicate one or more answers. Depressible buttons 305 in one example bonded to the beverage container through glue, bonding, etc. In another example, depressible buttons 305 are formed integrally with beverage container 300. Beverage container 300 in one example is provided to a customer when purchasing a refreshment, such as a soft drink.

Figure 4:
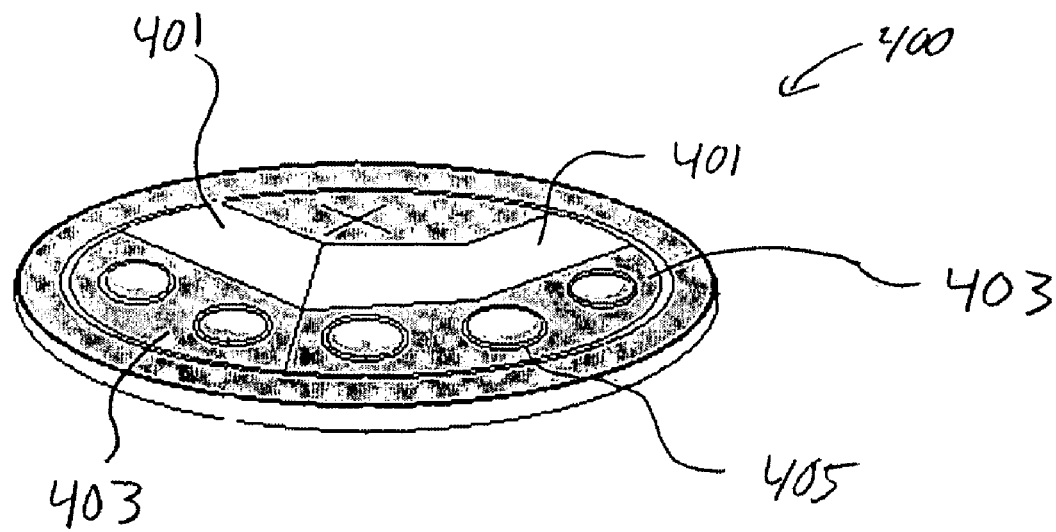
FIG. 4 is top view perspective view of a DCD implemented as a container lid.

In FIG. 4, a container lid 400 is adapted to collect survey data by utilizing one or more lid question portions 401 and corresponding one or more lid response portions 403. Lid response portions 403 contain one or more depressible buttons 405 to indicate an answer of the user. As with the preceding example, lid questions and lid responses could be attached through the use of a label or marked directly on container lid 400. Similarly, depressible buttons 405 could be bonded to container lid 400 or formed integrally with container lid 400. Container lid 400 in one example is used in conjunction with beverage container 300 (FIG. 3) and/or DCD 101 (FIG. 1). DCD 101 for example could be used to collect customer survey data while beverage container 300 could be used to collect customer demographic data.

Figure 5:
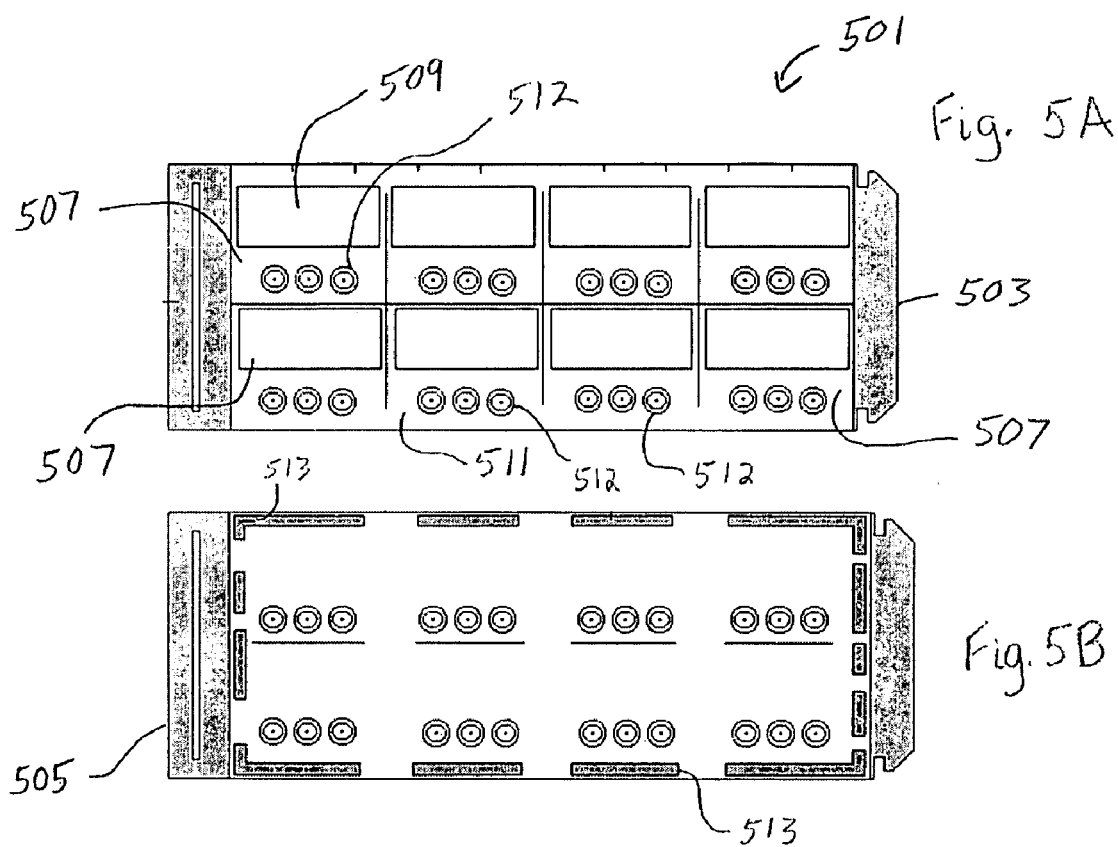
FIG. 5A is a plan view of a front side of another example of a DCD.
FIG. 5B is a plan view of a back side of another example of a DCD.
Figure 6:
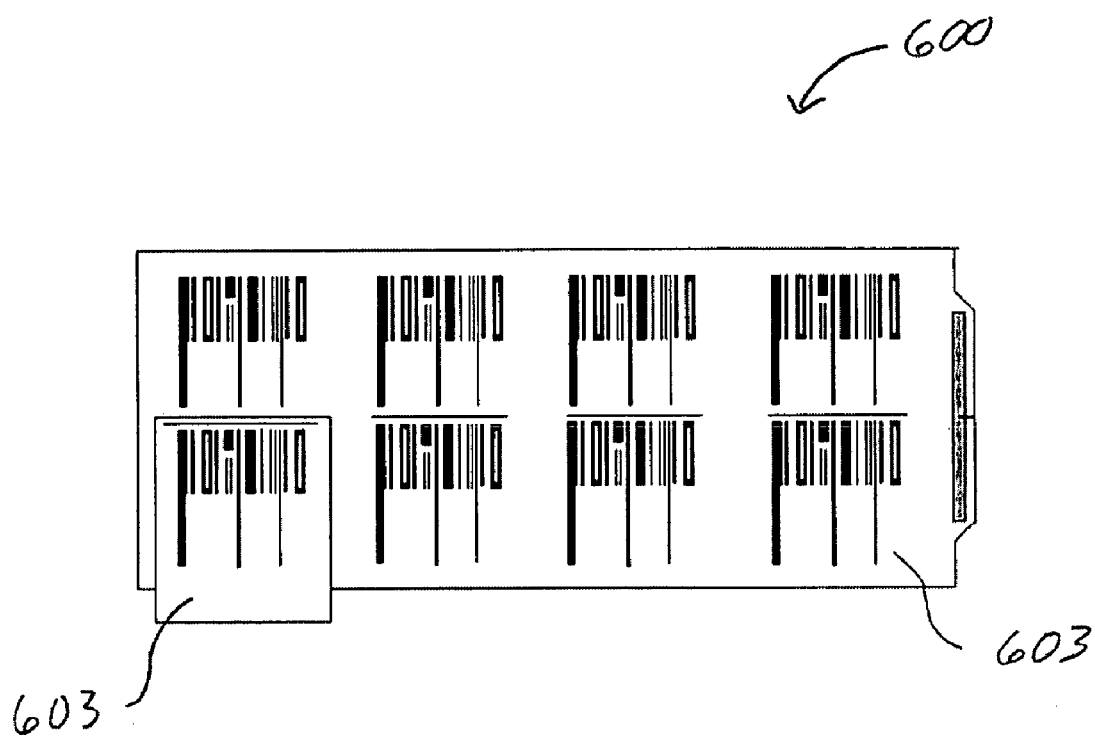
FIG. 6 is a plan view of a bar coded self mailing survey attachable to the DCD of FIGS. 5A and 5B.

Referring to FIGS. 5A–8, a self-mailing option could be added to the exemplary embodiments described above. Self-mailing would provide vendors with an additional method of receiving completed DCD surveys. FIGS. 5A and 5B depicts DCD 501 having a front side 503 and back side 505. DCD 501 is similar to DCD 101 shown in FIGS. 1–2. Front side 503 includes question and answer cells 507. Each cell 507 comprises a question portion 509 and a response portion 511. Each response portion 511 includes one or more depressible buttons 512 to identify a response of a user. Back side 505, however, also contains adhesive 513. Adhesive 513 is used to attach self mailing survey (SMS) 600 (FIG. 6) to the back side 505 of DCD 501.

Figure 7:
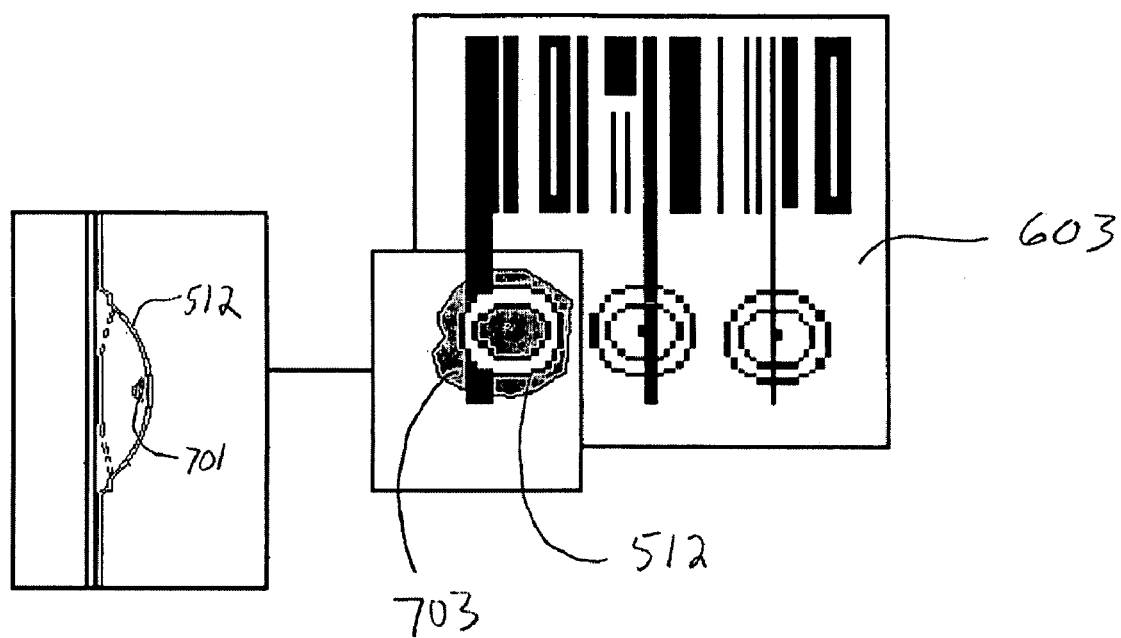
FIG. 7 is a magnified view and side magnified view of a depressible button located on the DCD of FIGS. 5A and 5B utilizing a dry ink pellet with an enlarged view of a front portion of the bar coded self mailing survey of FIG. 6 with dry ink from the dry ink pellet memorializing a choice of a user.
Figure 8:
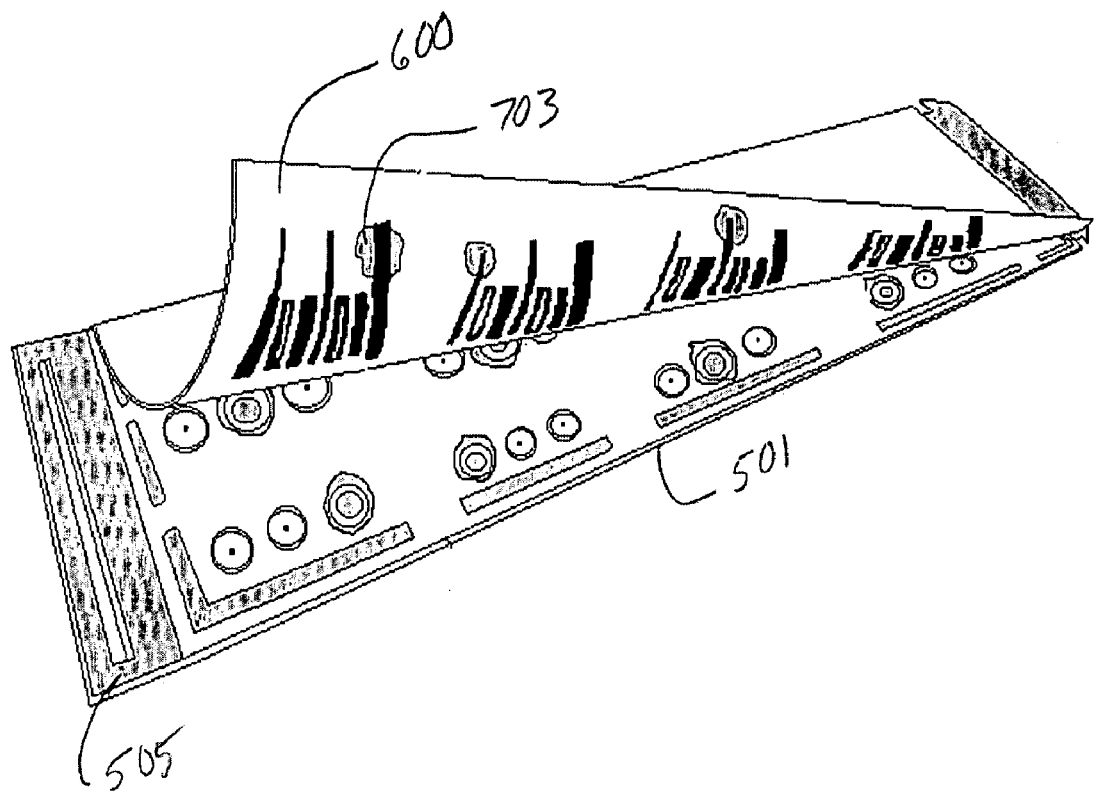
FIG. 8 is a top perspective view of the back of the DCD of FIG. 5B with the self mailing survey shown in FIG. 6 partially peeled away.

SMS 600 in one example comprises a paper or plastic strip. SMS 601 has one or more bar codes displayed 603. Each bar code 603 corresponds to question and answer cells 507 of DCD 501. To capture a response of a user, depressible buttons 512 include dry ink pellets 701 (FIG. 7). When a depressible button 512 is depressed, dry ink pellet 701 deposits ink 703 over the surface of DCD 501. Ink 703 therefore serves as a marker which identifies the particular response of the user. Ink 703 in one example serves as a visual indicator of a user response. In another example, ink 703 could serve as a machine readable indicator of a user response.

Once the user has completed a survey, he or she may be offered the opportunity to turn it in for an immediate survey participation gift. As an alternative, the user could remove SMS 600 from DCD 501 and return it by mail. If the user elects to respond to the survey by mailing in a response, then the user in one example is asked to complete a customer information section—name, address and email on the area provided on the SMS 600. The user would then detach SMS 600 from back 505 of DCD 501. SMS 600 is detached by peeling it from back 505 of DCD 501 (see FIG. 8). Once SMS 600 is removed from DCD 501, the user can send SMS 600 to a central collection point by mail. In one example, respondents will receive either an email or mailed notice confirming and thanking the respondent for their survey. The notice will also provide both the terms and conditions of the survey, contest, etc. For example, SMS 600 could offer respondents an opportunity to win trips, vehicles and cash prizes. The vendor can use the information provided by SMS 600 for future marketing and survey efforts.

While a detailed description of the preferred embodiment of the invention has been given, it should be appreciated that many variations can be made thereto without departing from the scope of the invention as set forth herein.

What is claimed is:

1. A data collection device comprising:
   at least one question and answer cell attached to at least one of: (a) a beverage container and (b) a drink sleeve;
   a drink implement provided to a user, said drink implement comprising at least one of a beverage container and a drink sleeve; and
   a question and answer cell attached to the drink implement said question and answer cell including a question portion bearing at least one question to a user and a depressible button having an answer portion in which the user can enter a response to the question by depressing the button;
   wherein the drink implement is collected from the user to analyze the response after the user has entered the response to the question in the answer portion.

2. The data collection device of claim 1, wherein the question and answer cell is formed integrally with the drink implement.

3. The data collection device of claim 1, wherein the drink implement is a drink sleeve and the drink sleeve is capable of being positioned about the beverage container.

4. The data collection device of claim 1, wherein the question portion is adhesively affixed to the drink implement.

5. A data collection device comprising at least one question and answer cell attached to at least one of a beverage container and a drink sleeve wherein the question and answer cell is comprised of a question portion and a response portion, the response portion including at least one depressible button the depressible button corresponding to a particular response to a question presented in the question portion of the question and answer cell; and
   at least one dry ink pellet contained within the depressible button and a self mailing survey adhesively affixed to at least one of the beverage container and the drink sleeve, the self mailing survey capable of capturing ink from the dry ink pellets.

6. The data collection device of claim 5, wherein the data collection device comprises a drink sleeve and the drink sleeve is comprised of a first end and a second end, the first end further comprised of a tapered portion and the second end further comprised of a slot portion, the drink sleeve capable of being wrapped around the beverage container by inserting the tapered portion of the first end into the slot portion of the second end.

7. A data collection device comprising:
a drink implement comprising at least one of a beverage container and a drink sleeve;
at least one question and answer cell attached to the drink implement; and
a container lid comprised of at least one lid question portion and at least one lid response portion, the lid response portion comprised of at least one depressible lid button corresponding to a particular response to a question presented in the lid question portion,
wherein the drink implement is collected from the user to analyze the response entered by the user using the at least one depressible lid button.

8. A method, comprising the steps of:
(a) providing a data collection device to at least one user, the device comprising at least one of: (i) a drink sleeve and (ii) a beverage container having at least one question and answer cell attached thereto;
(b) collecting the data collection device from the at least one user after the user bas completed a response to the at least one question and answer cell; and
(c) analyzing the at least one response from the data collection device.

9. The method of claim 8, further comprising the step of providing the question and answer cell with a question portion and a response portion.

10. The method of claim 9, further comprising the step of employing the response portion of the question and answer cell with at least one depressible button, the depressible button corresponding to a particular response to a question presented in the question portion of the question and answer cell.

11. The method of claim 9, wherein the step of providing the data collection device comprises: selecting a drink sleeve and adhesively affixing the question portion to the drink sleeve.

12. The method of claim 9, wherein the step of providing the data collection device comprises selecting a drink sleeve, the method further comprising the step of providing the drink sleeve with the response portion comprised of a space for the at least one user to indicate a particular response to a question presented in the question portion of the question and answer cell to produce survey data.

13. The method of claim 9, wherein the step of providing the data collection device comprises selecting a drink sleeve, the method further comprising the step of providing the drink sleeve with a response portion comprised of at least one depressible button corresponding to a particular response to a question presented in the question portion of the question and answer cell.

14. The method of claim 13, further comprising the step of adhesively affixing a self mailing survey to the drink sleeve.

15. The method of claim 14, further comprising the step of employing at least one dry ink pellet contained within the at least one depressible button, the self mailing survey capable of capturing ink from the dry ink pellets.

16. The method of claim 15, further comprising the step of applying at least one bar code to the self mailing survey, the bar code corresponding to the question and answer cell of the data collection device.

17. The method of claim 8, wherein the step of providing the data collection device comprises the steps of: selecting a beverage container as the data collection device, and integrally forming the question and answer cell with the beverage container.

18. The method of claim 8, further comprising the step of employing a container lid in conjunction with the beverage container or the drink sleeve to collect survey data, the container lid comprised of at least one lid question portion and at least one lid response portion, the lid response portion comprised of at least one depressible lid button corresponding to a particular response to a question presented in the lid question portion.

19. The method of claim 8, further comprising the step of collecting the data collection device from a drop off box after the user has completed a response to at least one question and answer cell.

20. The method of claim 8, further comprising the step of collecting the data collection device from delivered mail after the user has completed a response to at least one question and answer cell.

21. The method of claim 8, further comprising the step of providing the user with a reward for completing at least one question and answer cell.

22. The method of claim 8, further comprising the steps of:
providing a data collection agent; and
utilizing the data collection agent to collect the data collection device in person from the user.

* * * * *